(12) United States Patent
Janke et al.

(10) Patent No.: US 9,044,739 B2
(45) Date of Patent: Jun. 2, 2015

(54) FOAM-BASED ADSORBENTS HAVING HIGH ADSORPTION CAPACITIES FOR RECOVERING DISSOLVED METALS AND METHODS THEREOF

(71) Applicant: UT-Battelle, LLC, Oak Ridge, TN (US)

(72) Inventors: Christopher J. Janke, Oliver Springs, TN (US); Sheng Dai, Knoxville, TN (US); Yatsandra Oyola, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/226,956

(22) Filed: Mar. 27, 2014

(65) Prior Publication Data

US 2014/0206782 A1 Jul. 24, 2014

Related U.S. Application Data

(62) Division of application No. 13/553,288, filed on Jul. 19, 2012, now Pat. No. 8,722,757.

(60) Provisional application No. 61/510,515, filed on Jul. 22, 2011.

(51) Int. Cl.
| | | |
|---|---|---|
| C08J 9/00 | (2006.01) | |
| C08J 9/34 | (2006.01) | |
| C08J 9/38 | (2006.01) | |
| C08J 9/36 | (2006.01) | |
| C08J 9/16 | (2006.01) | |
| C08G 61/04 | (2006.01) | |
| B01J 20/26 | (2006.01) | |
| C08J 3/28 | (2006.01) | |
| D02G 3/22 | (2006.01) | |
| D02G 3/34 | (2006.01) | |
| C08J 7/16 | (2006.01) | |
| B01J 45/00 | (2006.01) | |
| B01J 20/28 | (2006.01) | |
| D06M 10/00 | (2006.01) | |
| D06M 11/63 | (2006.01) | |
| D06M 14/28 | (2006.01) | |
| D06M 15/263 | (2006.01) | |
| D06M 15/31 | (2006.01) | |
| D06M 101/20 | (2006.01) | |

(52) U.S. Cl.
CPC B01J 20/265 (2013.01); C08J 3/28 (2013.01); D02G 3/22 (2013.01); D02G 3/34 (2013.01); Y10T 428/2978 (2015.01); Y10T 428/2973 (2015.01); C08J 7/16 (2013.01); B01J 45/00 (2013.01); B01J 20/28023 (2013.01); D06M 10/008 (2013.01); D06M 11/63 (2013.01); D06M 14/28 (2013.01); D06M 15/263 (2013.01); D06M 15/31 (2013.01); D06M 2101/20 (2013.01); B01J 20/28033 (2013.01); C08J 9/36 (2013.01)

(58) Field of Classification Search
CPC .................. C08J 3/28; C08J 7/16; C08J 9/36; D02G 3/34; D02G 3/22; B01J 20/265; B01J 20/28023; B01J 20/28033; B01J 45/00; D06M 11/63; D06M 15/263; D06M 2101/20; D06M 10/008; D06M 14/28; D06M 15/31
USPC .............. 521/50.5, 50, 51, 52, 53, 56, 78, 82, 521/134; 520/1
See application file for complete search history.

(56) References Cited

U.S. PATENT DOCUMENTS

| 4,361,493 A | * | 11/1982 | Kiefer | ............................. 252/184 |
|---|---|---|---|---|
| 4,622,366 A | * | 11/1986 | Sugo et al. | ..................... 525/380 |
| 5,162,074 A | | 11/1992 | Hills | |
| 5,276,103 A | | 1/1994 | Yoshiaki et al. | |
| 5,344,297 A | | 9/1994 | Hills | |
| 5,466,410 A | | 11/1995 | Hills | |
| 5,533,883 A | | 7/1996 | Hodan et al. | |
| 5,551,588 A | | 9/1996 | Hills | |
| 5,562,930 A | | 10/1996 | Hills | |
| 5,575,063 A | | 11/1996 | Hodan et al. | |
| 5,620,644 A | | 4/1997 | Hodan et al. | |
| 6,852,233 B1 | | 2/2005 | Sugo et al. | |
| 6,863,812 B2 | | 3/2005 | Sugo et al. | |
| 2005/0272876 A1 | | 12/2005 | Seko et al. | |
| 2008/0230471 A1 | * | 9/2008 | Tamada et al. | ................ 210/505 |

OTHER PUBLICATIONS

Tamada, Masao, Current Status of Technology for Collection of Uranium From Seawater, Japan Energy Agency, Erice Seminar 2009, pp. 1-9.

* cited by examiner

*Primary Examiner* — Ling Choi
*Assistant Examiner* — Jessica E Whiteley
(74) *Attorney, Agent, or Firm* — Warner Norcross & Judd LLP

(57) ABSTRACT

Foam-based adsorbents and a related method of manufacture are provided. The foam-based adsorbents include polymer foam with grafted side chains and an increased surface area per unit weight to increase the adsorption of dissolved metals, for example uranium, from aqueous solutions. A method for forming the foam-based adsorbents includes irradiating polymer foam, grafting with polymerizable reactive monomers, reacting with hydroxylamine, and conditioning with an alkaline solution. Foam-based adsorbents formed according to the present method demonstrated a significantly improved uranium adsorption capacity per unit weight over existing adsorbents.

4 Claims, 19 Drawing Sheets

Dinitrile Compounds

13 D & 13 F (ethoxymethylene)malononitrile

14 D 2-amino - 1,1, 3-propenetricarbonitrile

15 D trans-3-hexenedinitrile

16 D benzylidenemalononitrile

17 D fumaronitrile

18 D (Dimethylaminomethylene)malononitrile

19 D 2-methyleneglutaronitrile

20 D 2-Cyanophenylacetonitrile

21 D & 21 F Diaminomaleonitrile

Cynanuric Chloride Core – Nitrile Containing Small Molecule 2-((4,6-dichloro-1,3,5-triazin-2-yl)amino)
prop-1-ene-1,1,3-tricarbonitrile 3,3',3'',3'''-((6-chloro-1,3,5-triazine-2,4-diyl)
bis(azanetriyl))tetrapropanenitrile 3-(benzyl(4,6-dichloro-
1,3,5-triazin-2-yl)amino)propanenitrile 3,3'-((4,6-dichloro-1,3,5-triazin-
2-yl)azanediyl)dipropanenitrile 2-((4-(bis(2-cyanoethyl)amino)-6-chloro-1,3,5-triazin-
2-yl) amino)prop-1-ene-1,1,3-tricarbonitrile

Hydroxylamine Alternatives

| | |
|---|---|
| hydroxylamine derivatives |  |
| hydrazine derivatives |  |
| hydrazine | $H_2N-NH_2$ |
| N-methylhydroxylamine |  |
| acetohydroxamic acid |  |
| N-benzylhydroxylamine hydrochloride |  |
| hydroxyurea |  |
| tert-butyl n-hydroxycarbamate |  |
| sym-diphenylhydrazine |  |
| methylhydrazine sulfate |  |
| phenylhydrazine hydrochloride |  |

| Sample | % DOG | Uranium adsorption capacity (g-U/kg-adsorbent) |
|---|---|---|
| 38H-#8 75AN/MAA | 382 | 129.6 |
| 42H-#12 75AN/MAA | 437 | 127.3 |
| 31H-#2 75AN/MAA | 236 | 125.5 |
| 31I-#2 90AN/MAA | 201 | 109.9 |
| 38G-#8 50AN/MAA | 162 | 109.9 |
| 32H-#1 75AN/MAA | 139 | 78.9 |
| 37H-#7 75AN/MAA | 146 | 63.7 |
| 33H-#3 75AN/MAA | 127 | 52.8 |
| Existing Nonwoven | 120 | 20 |

FOAM-BASED ADSORBENTS HAVING HIGH ADSORPTION CAPACITIES FOR RECOVERING DISSOLVED METALS AND METHODS THEREOF

CROSS-REFERENCE TO RELATED APPLICATIONS

This application is a divisional of prior application Ser. No. 13/553,288, filed Jul. 19, 2012, which claims the benefit of U.S. Provisional Application No. 61/510,515, filed Jul. 22, 2011, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to fiber-based adsorbents for the recovery of uranium and other dissolved metals from aqueous solutions.

Uranium is dissolved in seawater across the world's oceans at a uniform concentration of approximately 3.2 ppb with the total amount of uranium in seawater of approximately 4-5 billion metric tons, which is about 1000 times larger than the amount of uranium in terrestrial ores. Most of the dissolved uranium in seawater exists as uranyl tricarbonate ion ($UO_2(CO_3)_3^{4-}$). Development of uranium adsorbents has been researched since the 1960s including work on hydrous titanium oxide and other metal oxides, however the adsorption capacity (about 0.1 g-Uranium/kg-adsorbent) and mechanical strength of these materials were deemed too low for practical use. In the 1980s efforts shifted towards developing uranium adsorbents containing organic materials including the amidoxime group which was found to be particularly promising for complexing uranyl ions in seawater. Polymeric beads containing these amidoxime groups were initially evaluated, however this approach was abandoned due to practical handling issues.

Fiber-based adsorbents containing amidoxime groups have been researched since the 1980s. Early versions were based on polyacrylonitrile fibers which were reacted with hydroxylamine to form amidoxime groups, however since these groups were formed evenly in the fiber, the mechanical strength of the fiber was insufficient to survive in the sea. To alleviate this issue, graft co-polymerization of polyolefin fibers (e.g., polyethylene and polypropylene) with polymerizable monomers was used to produce either nonwoven or continuous fiber braided adsorbents. This process involved co-grafting nitrile groups (e.g., acrylonitrile) and hydrophilic groups (e.g., methacrylic acid) onto previously-irradiated polyolefin fibers having a diameter of at least 15 microns to form grafted side chains, then reacting the nitrile groups with hydroxylamine ($NH_2OH$) to convert them to amidoxime groups followed by alkaline (e.g., KOH) conditioning.

The nonwoven adsorbents were investigated for many years; however these materials are constructed using short, discontinuous, thermally spun-bonded fibers which have relatively poor mechanical strength compared to continuous fiber forms. In particular, nonwoven adsorbents were evaluated in several seawater experiments and demonstrated uranium adsorption capacities of about 1.5 g-Uranium (U)/kg-adsorbent after 30 days immersion in seawater. Due to their low mechanical strength, the nonwoven adsorbents necessitated their incorporation into large sandwich stacks composed of spacer nets and stack holders placed on large, heavy floating frames which eventually proved too costly for implementation. In addition, the sandwich stacks containing the nonwoven adsorbent prevented good accessibility to the seawater resulting in lower adsorption capacities compared to braided adsorbents. These braided adsorbents are composed of continuous polyethylene fibers that are braided around a porous polypropylene float that can be made into long lengths. The braided adsorbent is currently the material of choice for uranium adsorbents due to the favorable balance of properties including high mechanical strength, elongation-to-break, durability, low cost, chemical resistance (i.e., acids, bases, solvents), as well as their ease of placement and retrieval from the sea. However, the uranium adsorption capacity of the braided polyethylene adsorbents is relatively low, at 1.5 g-U/kg-adsorbent after 30 days immersion in seawater, to be cost effective for implementation.

Accordingly, there remains a continued need for an improved fiber-based adsorbent having an increased adsorption capacity for the recovery of uranium and/or other dissolved metals from seawater, river water and other aqueous solutions.

SUMMARY OF THE INVENTION

In a first aspect of the invention, a fiber-based adsorbent and a related method of manufacture are provided. The fiber-based adsorbent and the related method include grafted polymer fibers having an increased surface area per unit weight to improve the adsorption of dissolved metals, for example uranium. The polymer fibers include a circular cross-section having a mean diameter of less than 15 microns in some embodiments, optionally less than about 1 micron. In other embodiments, the polymer fibers include a non-circular cross-section, optionally defining multiple gear-shaped, lobe-shaped or winged-shaped projections along the length of the polymer fibers.

In a first embodiment, a method for manufacturing an adsorbent material includes providing polyolefin fibers including a circular cross-section having a mean diameter of less than about 15 microns, optionally less than about 1 micron, and further optionally about 0.25 microns, exposing the polyolefin fiber to ionizing radiation, co-grafting polymerized monomers containing nitrile and hydrophilic groups to form grafted side chains, converting the nitrile groups in the grafted side chains into amidoxime groups, and conditioning the resulting structure with an alkaline solution. Co-grafting is optionally performed while the polyolefin fiber is exposed to ionizing radiation, or alternatively after the polyolefin fiber is exposed to ionizing radiation. The adsorbent, and in particular, the grafted side-chains, are adapted to complex uranium ions from an aqueous solution, optionally having a uranium adsorption capacity of at least about 50 g-U/kg-adsorbent from an aqueous solution including 6-7 ppm uranyl nitrate hexahydrate.

In a second embodiment, a method for manufacturing an adsorbent material includes providing polyolefin fibers including a non-circular morphology, exposing the polyolefin fiber to ionizing radiation, co-grafting polymerized monomers containing nitrile and hydrophilic groups to form grafted side chains, converting the nitrile groups in the grafted side chains into amidoxime groups, and conditioning the resulting structure with an alkaline solution. The non-circular morphology can include a lobed-morphology, a core/shell or sheathed morphology, or any morphology having at least one surface projection or surface recess along the polyolefin fiber. For example, the fiber cross-section can be trilobial-shaped, gear-shaped, flower-shaped, and the fiber can be hollow or solid as desired. Co-grafting is optionally performed while the polyolefin fiber is exposed to ionizing radiation, or alternatively after the polyolefin fiber is exposed to ionizing radiation. The adsorbent, and in particular, the grafted side chains, are adapted to complex uranium ions from an aqueous solution, optionally having a uranium adsorption capacity of at least about 50 g-U/kg-adsorbent from an aqueous solution including 6-7 ppm uranyl nitrate hexahydrate.

In the above embodiments, the polyolefin fiber can include, for example, polyethylene or polypropylene, and the fiber can also include polyamide, polyester, polyvinyl alcohol, polyvinyl chloride, polytetrafluoroethylene-ethylene copolymer, polyacrylonitrile, and combinations thereof. The selected fiber can form a woven fabric, a braided fabric, a knitted fabric or non-woven fabric, or any other textile form whether now known or hereinafter developed. To convert the nitrile groups into amidoxime groups, the above methods can include reacting the nitrile groups in the grafted side chains with hydroxylamine, or alternatively, hydroxylamine derivatives, hydrazine, hydrazine derivatives, N-methylhydroxylamine, acetohydroxamic acid, N-benzylhydroxylamine hydrochloride, hydroxyurea, tert-butyl n-hydroxycarbamate, sym-diphenylhydrazine, methylhydrazine sulfate, phenylhydrazine or hydrochloride. Also in the above embodiments, the nitrile groups can include, for example, acrylonitrile, vinylidene cyanide, crotonnitrile, methacrylonitrile, chloroacrylonitrile, 2-cyanomethacrylate or 2-cyanoethylacrylate, and the hydrophilic groups can include, for example, methacrylic acid, acrylic acid, itaconic acid, 2-hydroxyethyl methacrylate, 2-hydroxyethyl acrylate, allyl alcohol, polyethylene glycol acrylate, polyethylene glycol methacrylate, polyethylene glycol diacrylate, polyethylene glycol dimethacrylate, N-vinylpyrrolidone, acrylamide, sulfonic acid group, carboxylic acid group, phenolic hydryoxyl group or phosphonic acid group.

In a second aspect of the invention, a method is provided for forming a foam-based adsorbent to recover metal ions from seawater and other aqueous solutions. The method includes providing an open-cell or closed-cell polyolefin foam, exposing the polyolefin foam to ionizing radiation, co-grafting polymerizable monomers containing nitrile groups and hydrophilic groups to form grafted side chains, converting the nitrile groups in the grafted side chains into amidoxime groups, and conditioning the foam with an alkaline solution to obtain a foam-based adsorbent capable of complexing metal ions from seawater or other aqueous solution. Co-grafting is optionally performed while the polyolefin foam is exposed to ionizing radiation, or alternatively after the polyolefin foam is exposed to ionizing radiation.

In a third aspect of the invention, a method is provided for forming a powder-based adsorbent to recover metal ions from seawater and other aqueous solutions. The method includes providing a powder including polyolefin granules, exposing the granules to ionizing radiation, co-grafting polymerizable monomers containing nitrile groups and hydrophilic groups to form grafted side chains, converting the nitrile groups in the grafted side chains into amidoxime groups, and conditioning the powder with an alkaline solution to obtain a powder-based adsorbent capable of complexing metal ions from seawater or other aqueous solution. Co-grafting is optionally performed while the polyolefin powder is exposed to ionizing radiation, or alternatively after the polyolefin powder is exposed to ionizing radiation.

These and other features and advantages of the present invention will become apparent from the following description of the invention, when viewed in accordance with the accompanying drawings and appended claims.

DETAILED DESCRIPTION OF THE CURRENT EMBODIMENTS

Figure 1:
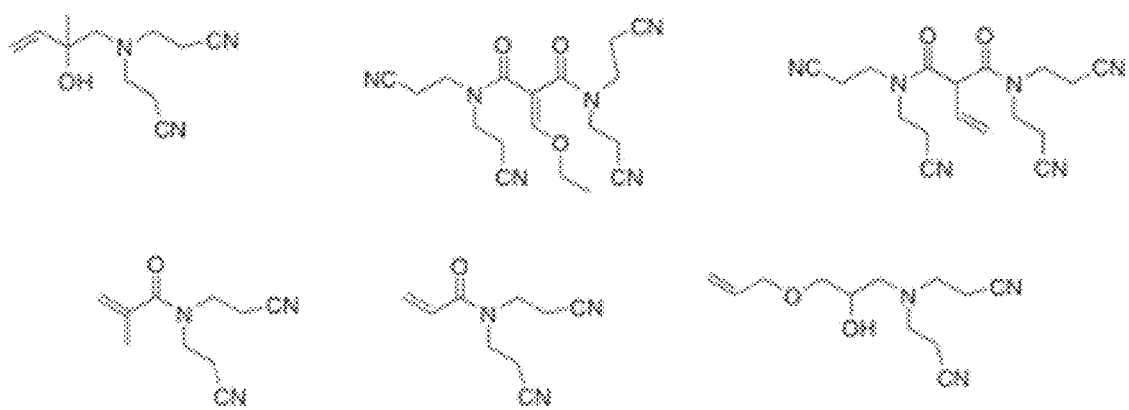
FIG. 1 are polymerizable monomers for forming grafted side chains containing nitrile groups in accordance with the present invention.

The invention as contemplated and disclosed herein includes high surface area fiber-based adsorbents having an increased adsorption capacity per unit weight for the recovery of metals, for example uranium, titanium, vanadium, gold, platinum, palladium, silver, rare earth metals, mercury, chromium, cadmium, lead, cobalt, zinc, copper, iron, nickel, and any other suitable metals, from seawater, river water and other aqueous solutions. As explained in greater detail below, the fiber-based adsorbents of the present invention are generally formed by irradiating high surface area polymer fibers, subsequently or simultaneously co-grafting polymerizable monomers containing nitrile groups and hydrophilic groups to form grafted side chains, converting the nitrile groups into grafted amidoxime groups, and conditioning the grafted fibers with an alkaline solution. The resulting fiber-based adsorbents are capable of selectively complexing uranyl ions and other metal ions from seawater or other aqueous solutions. The uranium can be eluted from the adsorbent by treating with mineral acids (e.g., HCl), organic acids (e.g., tartaric acid), sodium carbonate or sodium bicarbonate. Regeneration of the adsorbent for subsequent re-use can be accomplished by KOH or other alkaline conditioning after acid elution has been completed.

I. Irradiating High Surface Area Polymer Fibers

The method for producing a fiber-based adsorbent generally includes exposing high surface area polymer fibers to ionizing radiation to form free radicals on the polymer fibers. Suitable polymer fibers can include polyolefin fibers, for example polyethylene and polypropylene, as well as polyamide, polyester, polyvinyl alcohol, polyvinyl chloride, polytetrafluoroethylene-ethylene copolymer, and mixtures thereof.

The selected polymer fibers can form a woven fabric, a braided fabric, a knitted fabric, or a nonwoven fabric, or other textile form whether now known or hereinafter developed. In addition, the selected polymer fibers can include a circular cross-section or a non-circular cross-section, and can be hollow or solid as desired. Fibers having a circular cross-section can define a mean diameter of less than 15 microns, optionally less than about 1 micron, further optionally about 0.25 microns. Fibers having a non-circular cross-section can include a lobe-shaped morphology, a wing-shaped morphology, a flower-shaped morphology, a gear-shaped morphology, or any morphology having at least one surface projection or surface recess along the polymer fiber as discussed more fully in Part IV below.

In the present embodiment, suitable ionizing radiation includes gamma ray radiation, electron beam radiation and x-ray radiation, optionally between about 10 kGy and about 500 kGy, inclusive. In addition, the irradiated polymer fibers are generally sealed within an inert environment to preserve the free radicals prior to grafting. For example, the polymer fibers can be sealed within a nitrogen environment, optionally at subzero temperatures, to prevent oxygen from reacting with the newly formed free radicals. While irradiation is typically conducted separately from graft polymerization, exposure to ionizing radiation can alternatively occur in the presence of the grafting monomers in liquid or vapor form while under inert conditions. For example, the method of the present invention can include simultaneously irradiating a high surface area polymer fiber while in the presence of polymerizable monomers in liquid form.

II. Co-Grafting Polymerizable Monomers

The present method additionally includes co-grafting polymerizable monomers onto the irradiated trunk polymers to form grafted side chains throughout the fiber volume. The polymerizable monomers can include monomers containing nitrile groups and hydrophilic groups contained within or without a solvent. Alternatively, the monomers containing nitrile groups and hydrophilic groups can be contained within an aqueous-based emulsion comprising a suitable surfactant. The surfactant can consist of an anionic surfactant, a cationic surfactant, an amphoric surfactant, a non-ionic surfactant or a mixture thereof. The monomers containing nitrile groups can include, for example, acrylonitrile, vinylidene cyanide, crotonnitrile, methacrylonitrile, chloroacrylonitrile, 2-cyanomethacrylate, 2-cyanoethylacrylate and mixtures thereof. The monomers containing hydrophilic groups can include, for example, methacrylic acid, acrylic acid, itaconic acid, 2-hydroxyethyl methacrylate, 2-hydroxyethyl acrylate, allyl alcohol, polyethylene glycol acrylate, polyethylene glycol methacrylate, polyethylene glycol diacrylate, polyethylene glycol dimethacrylate, N-vinylpyrrolidone, acrylamide and mixtures thereof. A grafting solution including polymerizable monomers can include one or more solvents, for example, dimethylsulfoxide, dimethylformamide and mixtures thereof.

Figure 2:
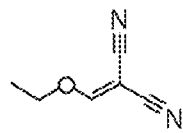
FIG. 2 are dinitrile compounds for forming grafted side chains containing nitrile groups in accordance with the present invention.
Figure 2:
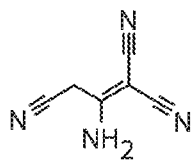
Figure 2:
Figure 2:
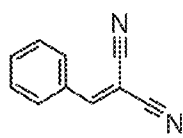
Figure 2:
Figure 2:
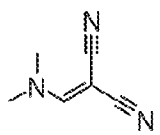
Figure 2:
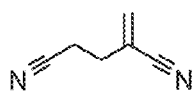
Figure 2:
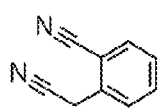
Figure 2:
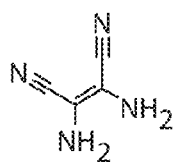

Side chains can also be formed by grafting different monomers containing one or more nitriles to the irradiated high surface area polymer fibers. Optional monomers include an alkene group that can react with the free radicals, and also contain one or more nitriles that will be converted to the amidoxime. The monomers containing nitrile groups can include acrylonitrile, vinylidene cyanide, crotonnitrile, methacrylonitrile, chloroacrylonitrile, 2-cyanomethacrylate, 2-cyanoethylacrylate and mixtures thereof. Additional examples of suitable monomers and their chemical structures are shown in FIG. 1. Additional examples of suitable dinitrile compounds and their chemical structure are shown in FIG. 2.

Figure 3:
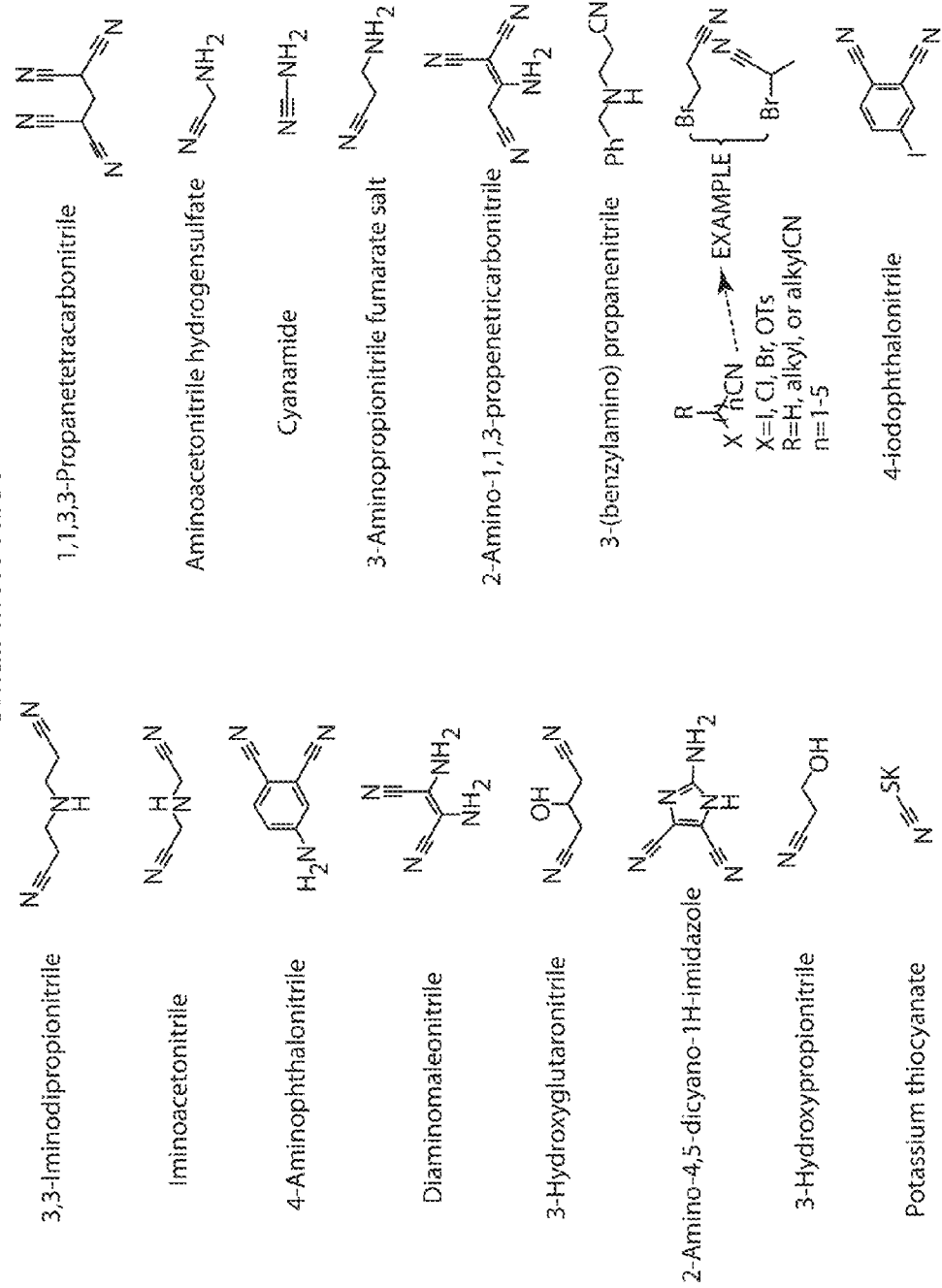
FIG. 3 are nitrile containing small molecules for forming grafted side chains in accordance with the present invention.
Figure 4:
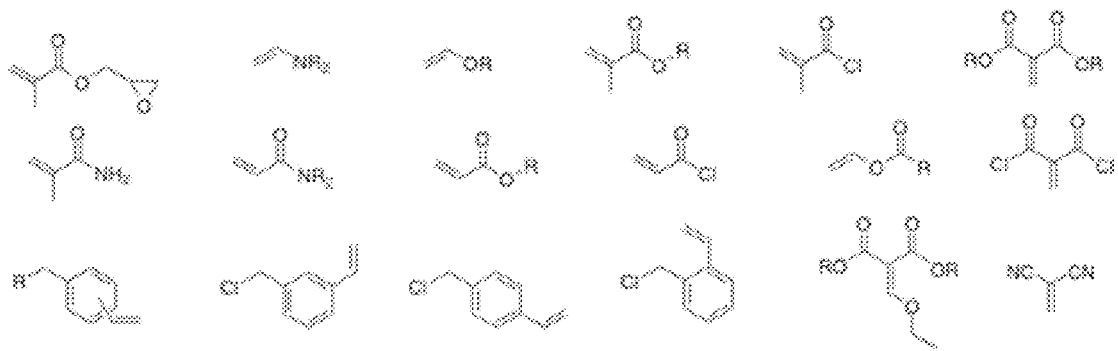
FIG. 4 are monomers for radical polymerization in accordance with the present invention.
Figure 5:
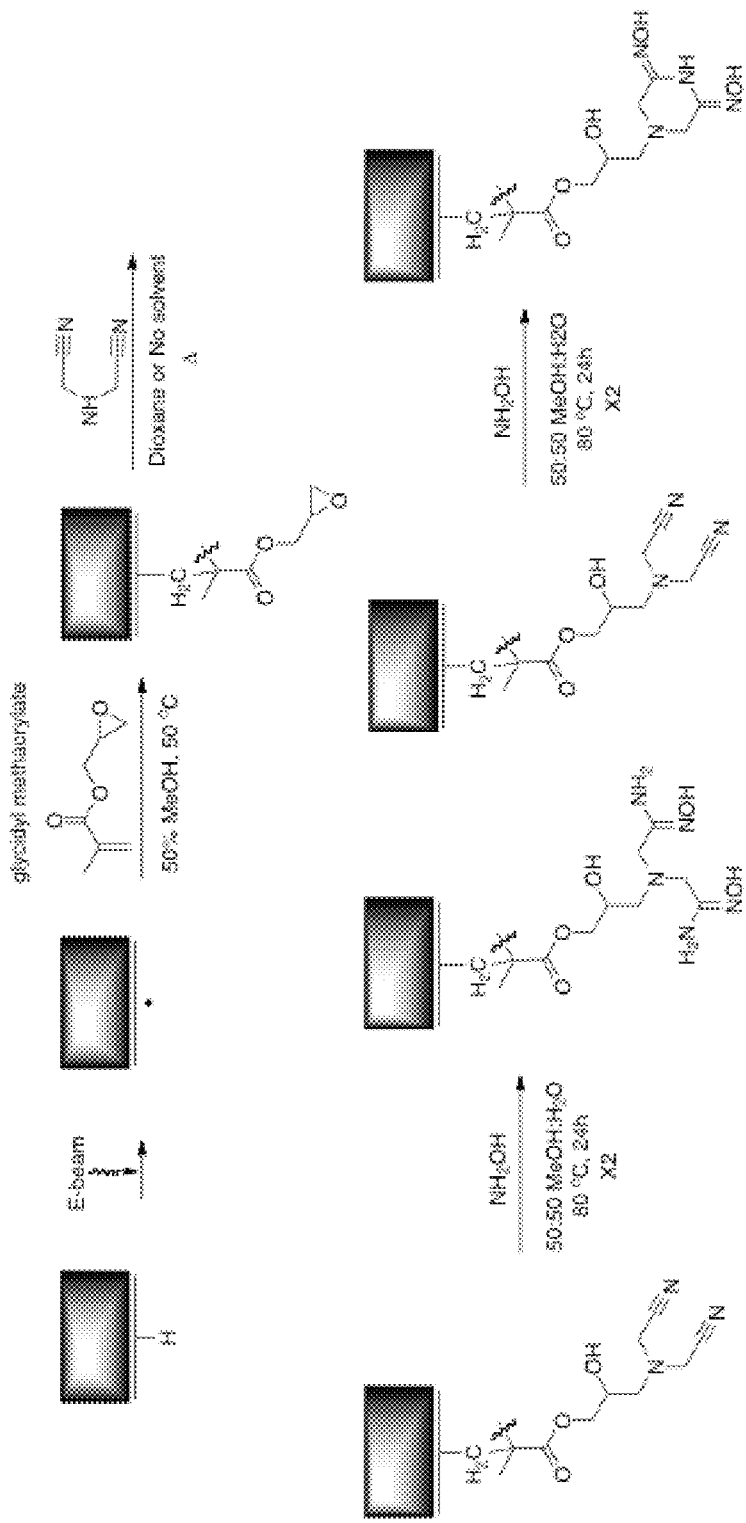
FIG. 5 depicts a first exemplary chemical modification into nitrile groups.
Figure 6:
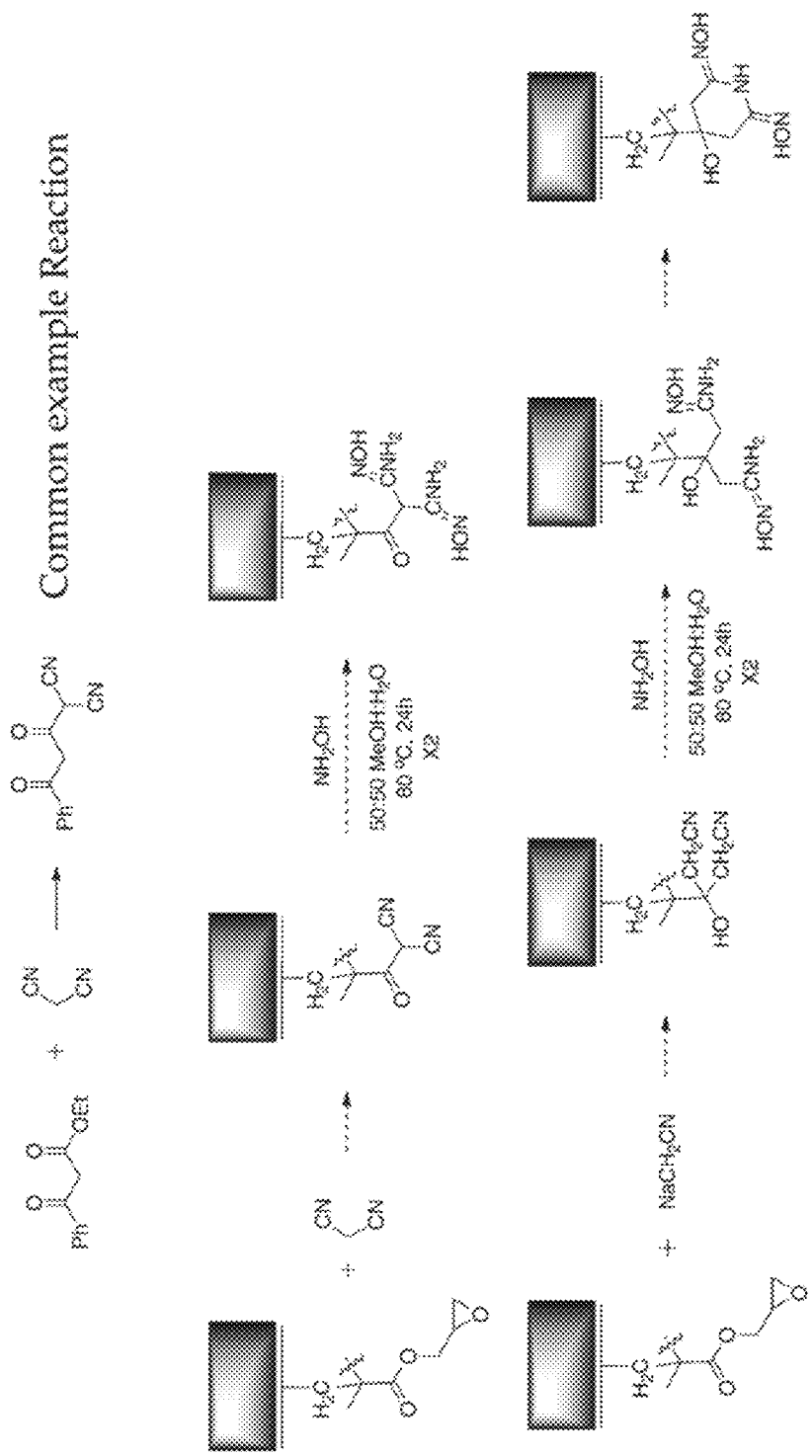
FIG. 6 depicts a second exemplary chemical modification into nitrile groups.
Figure 7:
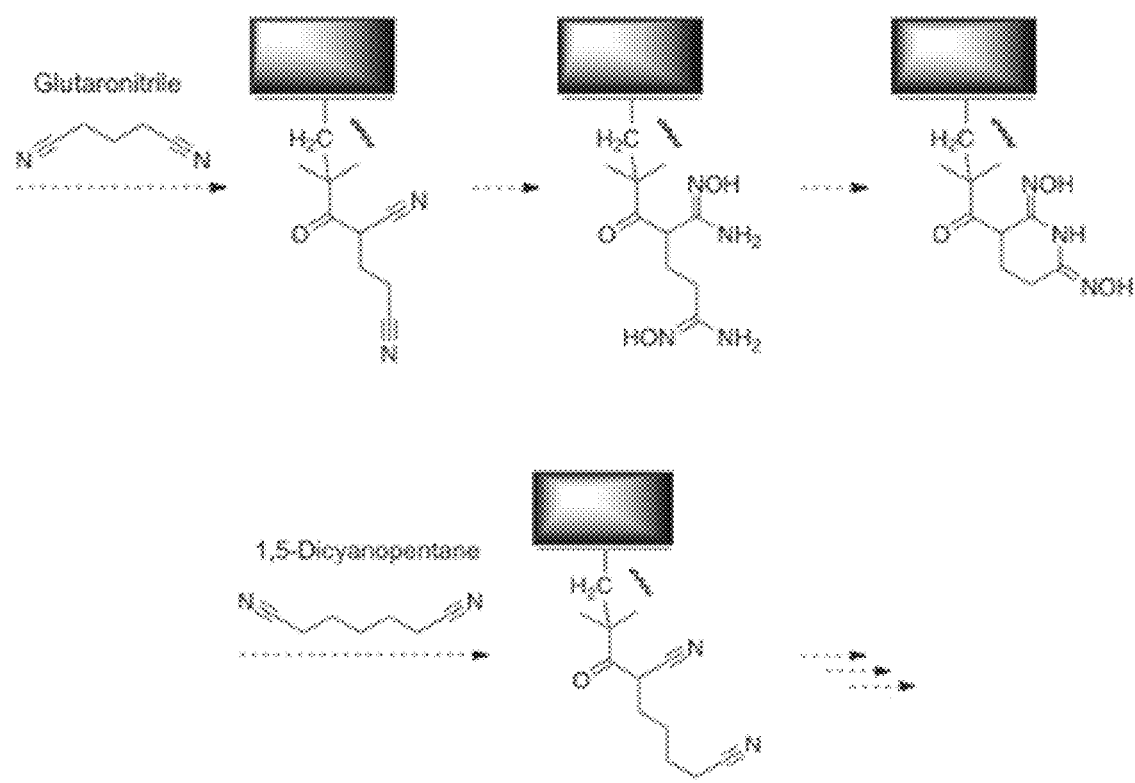
FIG. 7 depicts nitrile introduction by alkylation of ester, ketone or alcohol.
Figure 8:
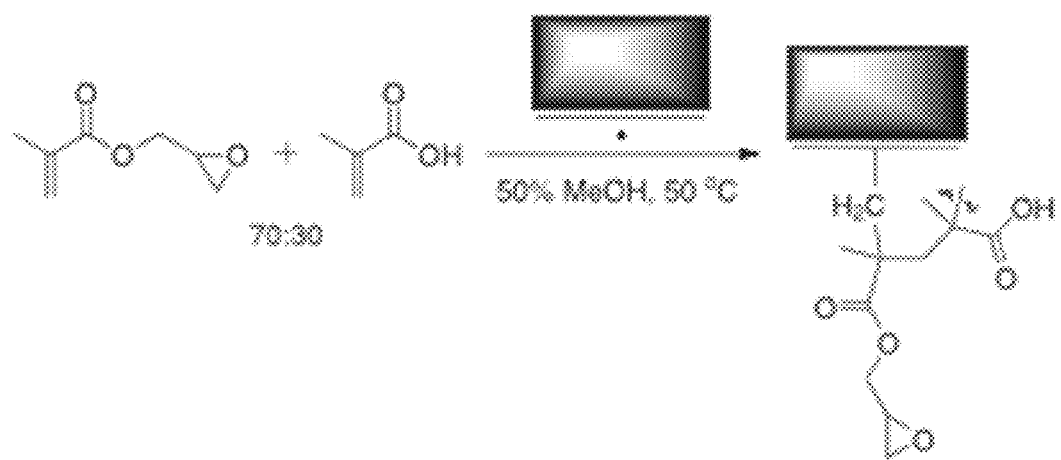
FIG. 8 depicts the addition of a co-monomer to the grafting solution.

To increase the range of compounds that can be grafted to the high surface area fibers, living radical polymerization monomers can be modified by reaction with nitrile containing small molecules. A list of exemplary nitrile containing small molecules and living radical polymerization monomers are shown in FIG. 3. In a reverse approach, living radical polymerization monomers can be attached to radiation generated free radicals on the high surface area fibers. Exemplary monomers for radical polymerization are shown in FIG. 4. These functionalized fibers can then be reacted chemically with the nitrile containing small molecules listed above. For the cases of glycidyl methacrylate grafted polymers, a chemical modification can introduce the desired nitrile groups. This chemical modification can take place on the epoxide pending group as shown in FIG. 5. Various amine or hydroxy containing groups can modify the side chains on glycidyl methacrylate as depicted in FIG. 3 (nitrile containing small molecules). Sometimes the dinitrile molecules can also form a cyclic form that can also be used for metal adsorption. Other acrylates have also been grafted following the same procedure as for gycidyl methacrylate as shown in FIG. 6, and can be modified with the same range of molecules depicted in FIG. 3 (nitrile containing small molecules). In the cases of acrylates such as methyl acrylate, ethyl acrylate, methyl methacrylate, butyl methacrylate, ethyl methacrylate and glycidyl methacrylate, the nitriles or desired fuctionalization can be introduced by alkylation of the ester to ketone or in some cases alcohol. This is illustrated in FIG. 7. Stable anions can be formed from the deprotonation of a carbon adjacent to an electron-withdrawing group such as nitriles. Small molecules like glutaronitrile, 1,5-dicyanopentane, acetonitrile, malononitrile and other similar compounds can be reacted with the polyacrylate grafted material. Hydrophilicity can be added to this material as well by adding a co-monomer like methacrylic acid to the grafting solution as shown in FIG. 8.

Figure 9:
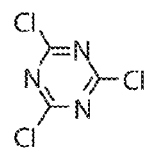
FIG. 9 are cyanuric chloride core, nitrile containing small molecules for forming grafted side chains in accordance with the present invention.
Figure 9:
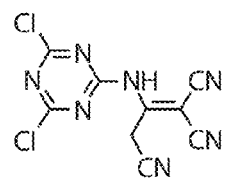
Figure 9:
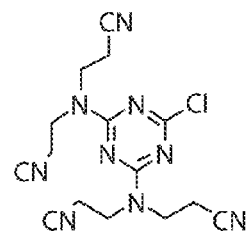
Figure 9:
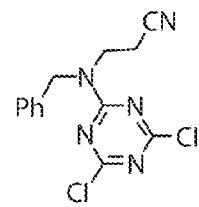
Figure 9:
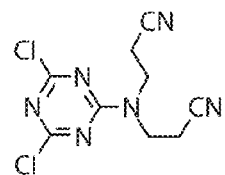
Figure 9:
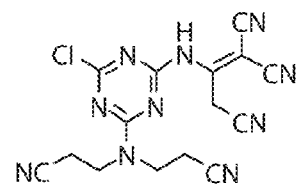

Additional nitriles can be added to the high surface area fibers by using a link, for example cyanuric chloride, to attach the nitrile containing molecules before they are attached to the fiber. The resulting molecule is first reacted with a living radical polymerization monomer, and subsequently reacted with the radiation generated radicals or by the reaction of the link with the already functionalized fiber. Another approach is to modify the same monomers listed in FIG. 9, before they are attached to the high surface area fiber, by first converting the nitrile functionality to amidoxime with hydroxylamine. If needed, any of these new grafted fibers can be made more hydrophilic with the addition of various ratios of nitrile containing monomers combined with hydrophilic monomers including: methacrylic acid, acrylic acid, itaconic acid, 2-hydroxyethyl methacrylate, 2-hydroxyethyl acrylate, allyl alcohol, polyethylene glycol acrylate, polyethylene glycol methacrylate, polyethylene glycol diacrylate, polyethylene glycol dimethacrylate, N-vinylpyrrolidone, acrylamide and mixtures thereof.

Irradiation induced grafting is not required in all embodiments however. For example, the method of the present invention can include providing a polyacrylonitrile. Where polyacrylonitriles are used, irradiation induced grafting can be omitted, and the above method can optionally include converting some of the nitrile groups into hydrophilic groups and other of the nitrile groups into amidoxime groups.

III. Converting Nitrile Groups into Amidoxime Groups and Conditioning

After the grafted side chains are formed on the irradiated high surface area fibers, the nitrile groups are converted into amidoxime groups. In the present embodiment, the grafted fibers are reacted with hydroxylamine ($NH_2OH$) to convert the nitrile groups to amidoxime groups. This conversion is followed by alkaline (e.g., KOH, NaOH) conditioning to produce fiber-based adsorbents capable of selectively complexing uranyl ions and other metal ions from seawater or other aqueous solutions.

Figure 10:
FIG. 10 are hydroxylamine alternatives for converting nitrile groups that can also selectively complex uranyl ions and other metal ions from an aqueous solution in accordance with the present invention.
Figure 10:
Figure 10:
Figure 10:
Figure 10:
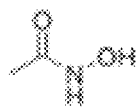
Figure 10:
Figure 10:
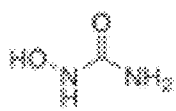
Figure 10:
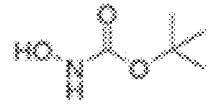
Figure 10:
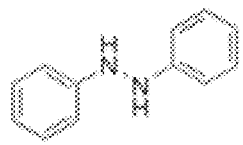
Figure 10:
Figure 10:

While hydroxylamine is used in the present embodiment, hydroxylamine can be substituted with a range of similar compounds that can also selectively complex uranyl ions and other metal ions from an aqueous solution, including for example seawater. Exemplary hydroxylamine substitutes can include hydroxylamine derivatives, hydrazine, hydrazine derivatives, N-methylhydroxylamine, acetohydroxamic acid, N-benzylhydroxylamine hydrochloride, hydroxyurea, tert-butyl n-hydroxycarbamate, sym-diphenylhydrazine, methylhydrazine sulfate, phenylhydrazine hydrochloride, with chemical structures depicted in FIG. 10.

To reiterate, the method for forming a fiber-based adsorbent generally includes irradiating high surface area polymer fibers, grafting with polymerizable reactive monomers, reacting the grafted fibers with hydroxylamine, and conditioning with an alkaline solution, for example potassium hydroxide or sodium hydroxide. The irradiated high surface area fibers are generally grafted with reactive monomers contained within a solvent, or contained within an aqueous-based emulsion comprising a suitable surfactant. In addition, the reactive monomers generally include, but are not limited to, nitrile and hydrophilic containing monomers, including the grafting monomers or mixtures discussed above. The fiber-based adsorbents are capable of selectively complexing uranyl ions and other metal ions from seawater or other aqueous solutions. The uranium is then eluted from the adsorbent by treating with mineral acids (e.g., HCl), organic acids (e.g., tartaric acid), sodium carbonate or sodium bicarbonate. Regeneration of the adsorbent for subsequent re-use can be accomplished by KOH or other alkaline conditioning after acid elution has been completed.

IV. High Surface Area Fibers

Figure 11:
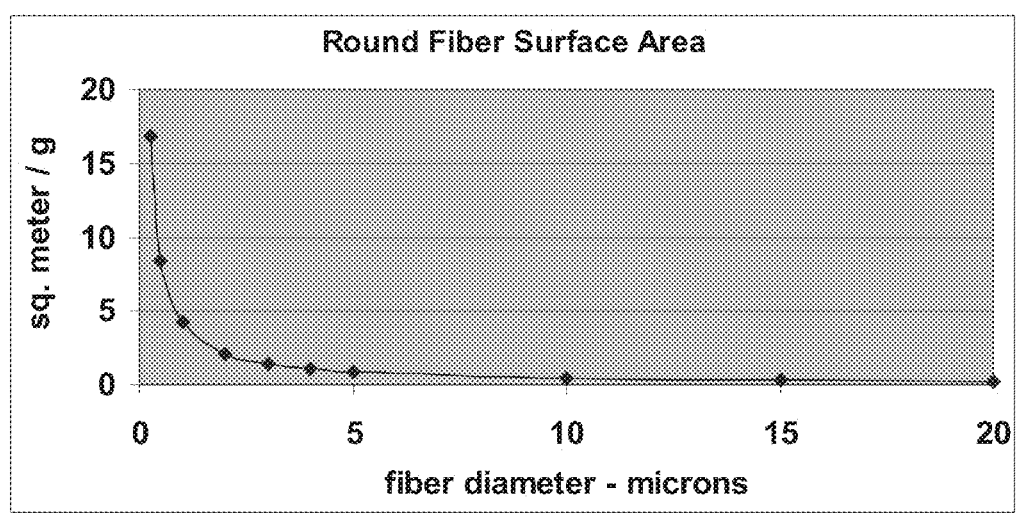
FIG. 11 is a graph illustrating the increase in surface area per unit mass as the fiber diameter is reduced.
Figure 12:
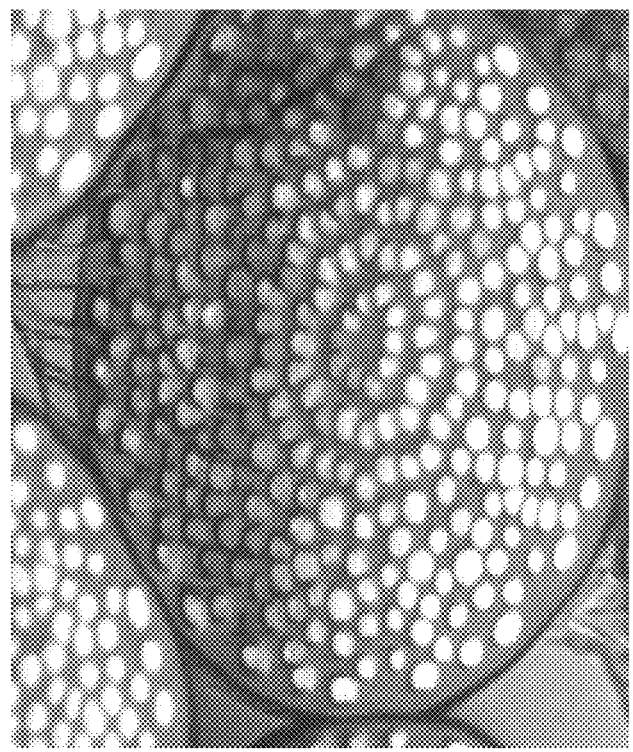
FIG. 12 is a first micrograph of high surface area fibers having an islands-in-the-sea morphology for use in accordance with the present invention.
Figure 13:
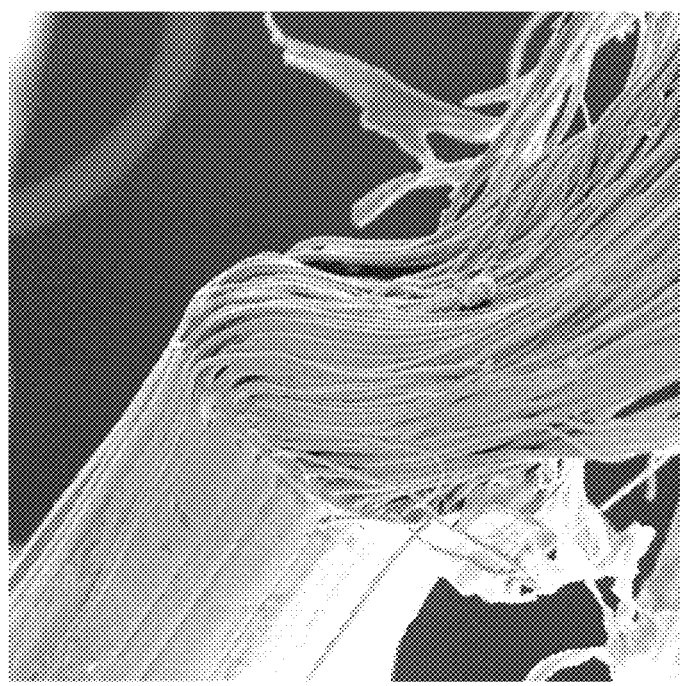
FIG. 13 is a second micrograph of high surface area fibers having an islands-in-the-sea morphology for use in accordance with the present invention.

The surface-area-to-weight-ratio for the fiber-based adsorbent produced according to the above method, and consequently its uranium adsorption capacity per unit weight, is substantially increased by reducing the diameter of the polymer fibers, by changing the cross-sectional shape of the polymer fibers, or a combination of both. As shown in FIG. 11 for example, a reduction in the diameter of a round fiber from 20 microns to less than 1 micron results in a significant increase in the fiber surface-area-per-unit-weight. Suitable high surface area fibers are commercially available from Hills Inc. of West Melbourne, Fla., and include both round fibers and non-round fibers. As used herein, "high surface area fibers" include (a) round fibers having a diameter of less than 15 microns and (b) non-round fibers with a greater surface-area-to-weight-ratio than a 15 micron round fiber. For example, round fibers formed according to an island-in-the-sea (I-S) method can achieve a 0.25 micron diameter, resulting in an 8000% increase in surface-area-per-unit-weight when compared with commercially available, 20 micron diameter, round fibers formed according to conventional melt-spinning processes. In the I-S fiber production method, nanofibers are embedded inside a fiber made of a dissolved polymer (e.g., polylactic acid). After the nanofibers are formed, the sea polymer is dissolved away to expose the nanofibers, optionally including as many as 156,000 nanofibers. For example, FIG. 12 illustrates a 300 islands-in-the-sea fiber cross-section, and FIG. 13 illustrates a 600 islands-in-the sea, with a 0.5 micron diameter after the sea polymer is dissolved.

Figure 14:
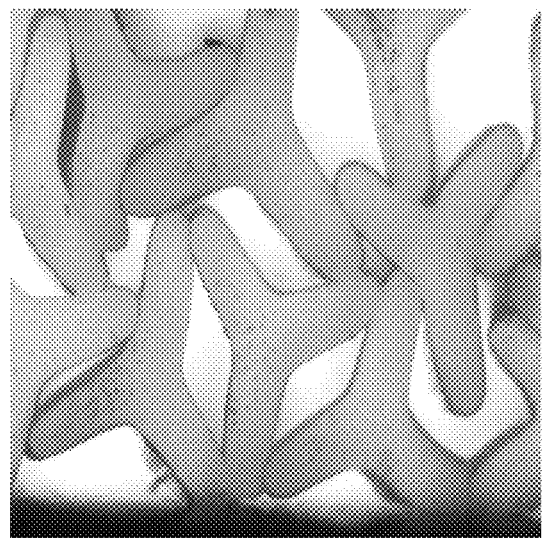
FIG. 14 is a micrograph of high surface area fibers having a trilobal morphology for use in accordance with the present invention.
Figure 15:
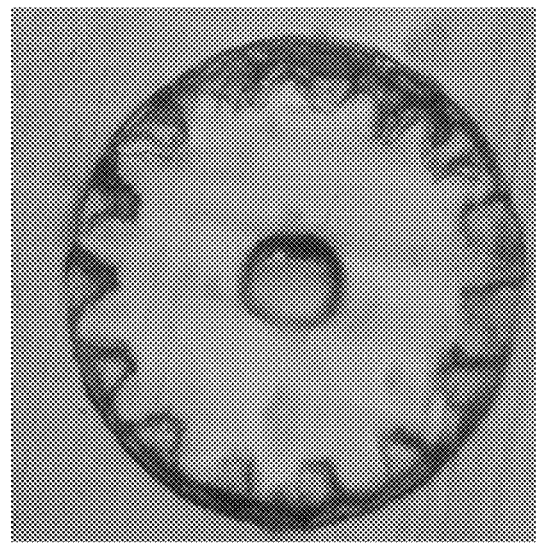
FIG. 15 is a micrograph of a high surface area fiber having a hollow gear shape morphology for use in accordance with the present invention.
Figure 16:
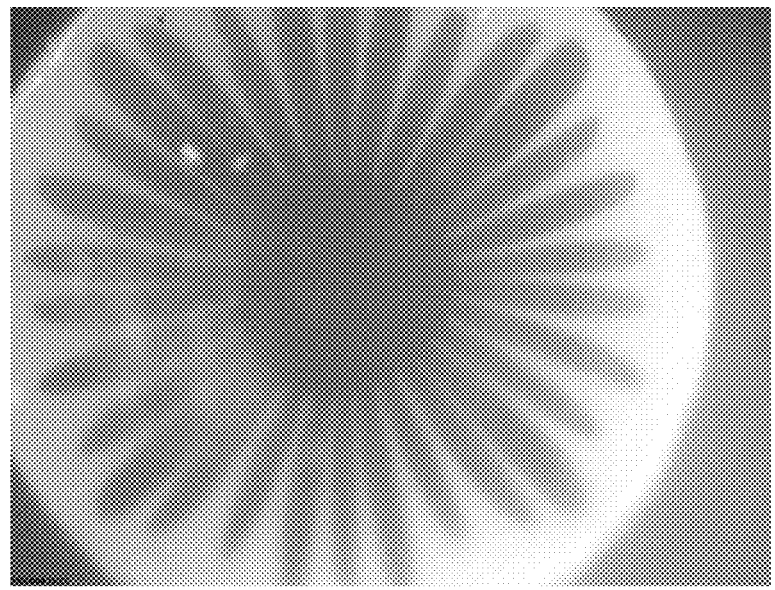
FIG. 16 is a micrograph of a high surface area fiber having a flower shape morphology for use in accordance with the present invention.
Figure 17:
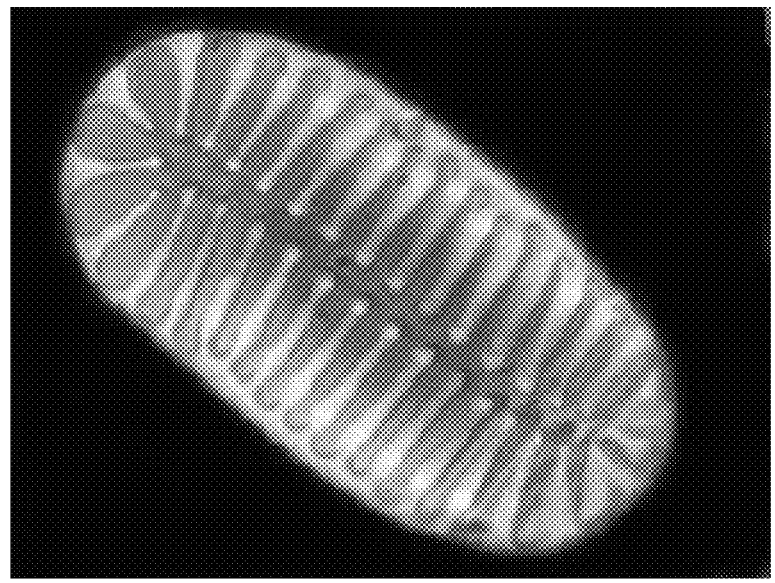
FIG. 17 is a micrograph of a high surface area fiber having a worm-shaped or winged-shaped morphology for use in accordance with the present invention.
Figure 18:
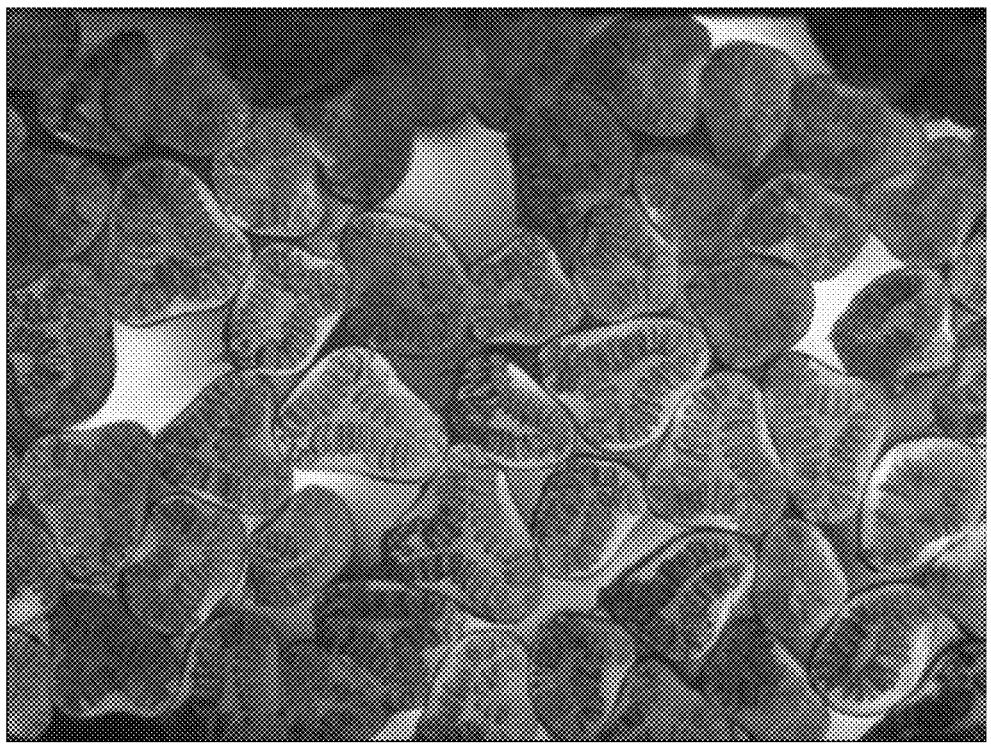
FIG. 18 is a micrograph of high surface area fibers having a solid trilobal gear shape for use in accordance with the present invention.
Figure 19:
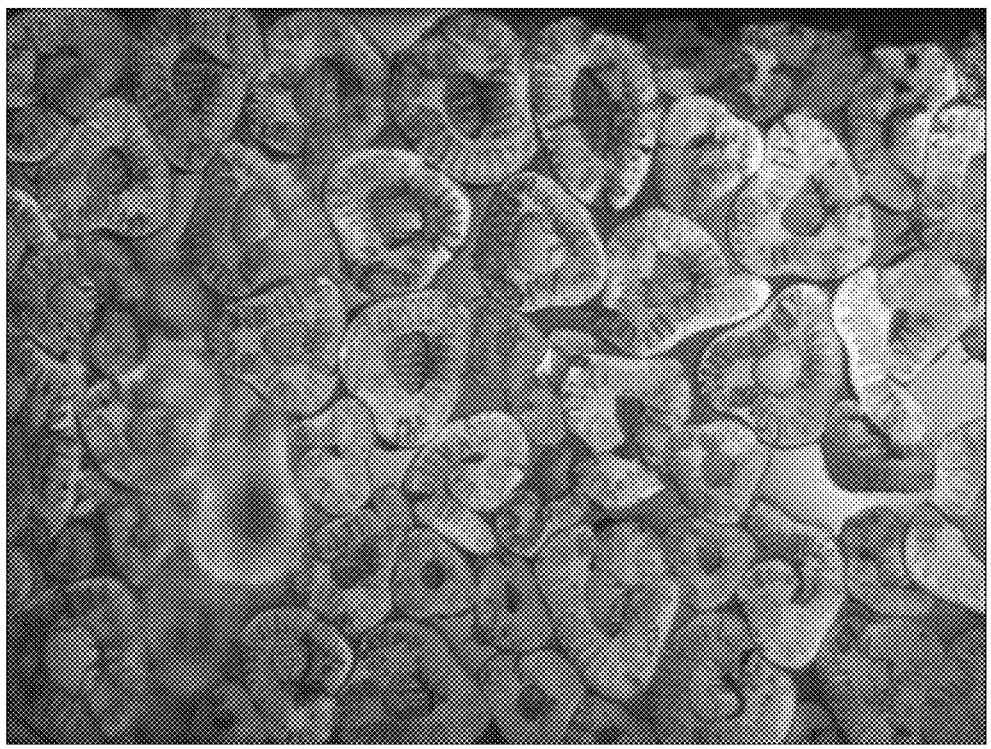
FIG. 19 is a micrograph of high surface area fibers having a hollow trilobal gear shape for use in accordance with the present invention.
Figure 20:
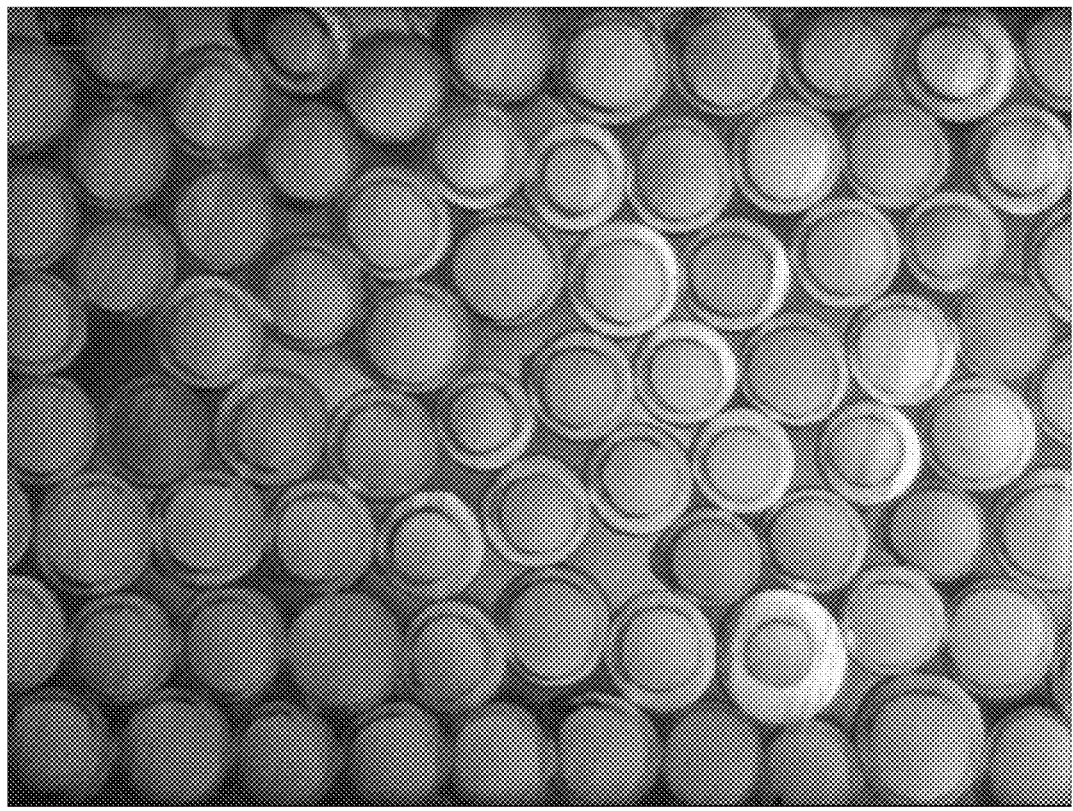
FIG. 20 is a micrograph of high surface area fibers having a small diameter sheath/core shape for use in accordance with the present invention.
Figure 21:
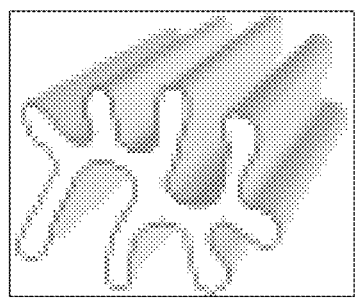
FIG. 21 is an illustration of 4DG™ high surface area fibers for use in accordance with the present invention.
Figure 22:
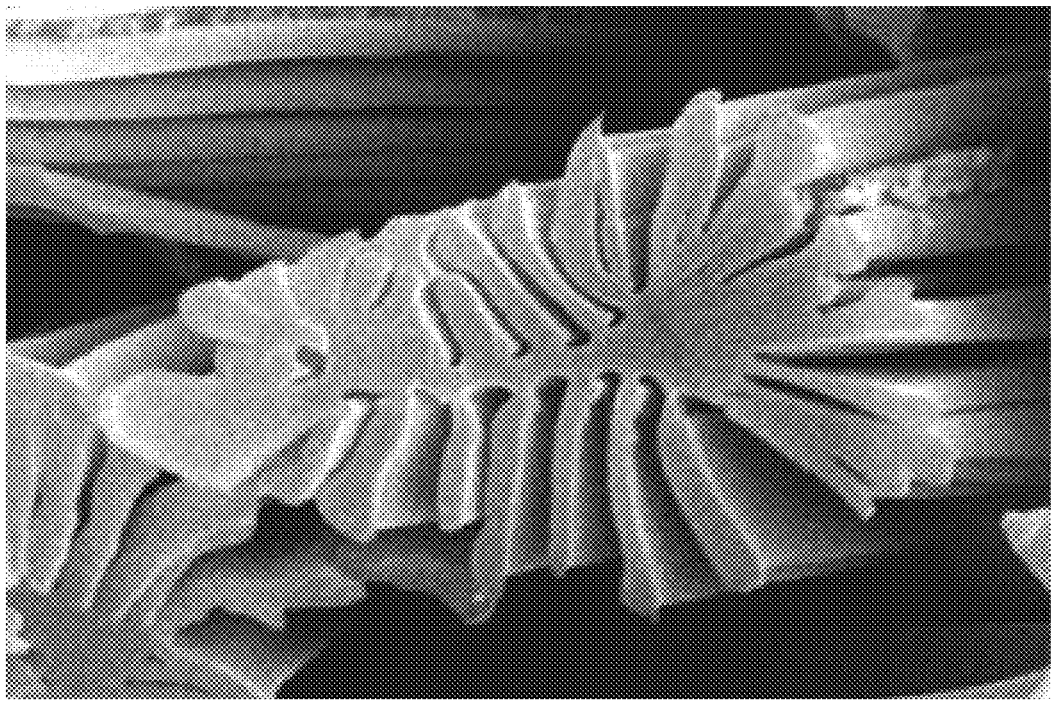
FIG. 22 is a micrograph of an Allasso® high surface area fiber for use in accordance with the present invention.
Figure 23:
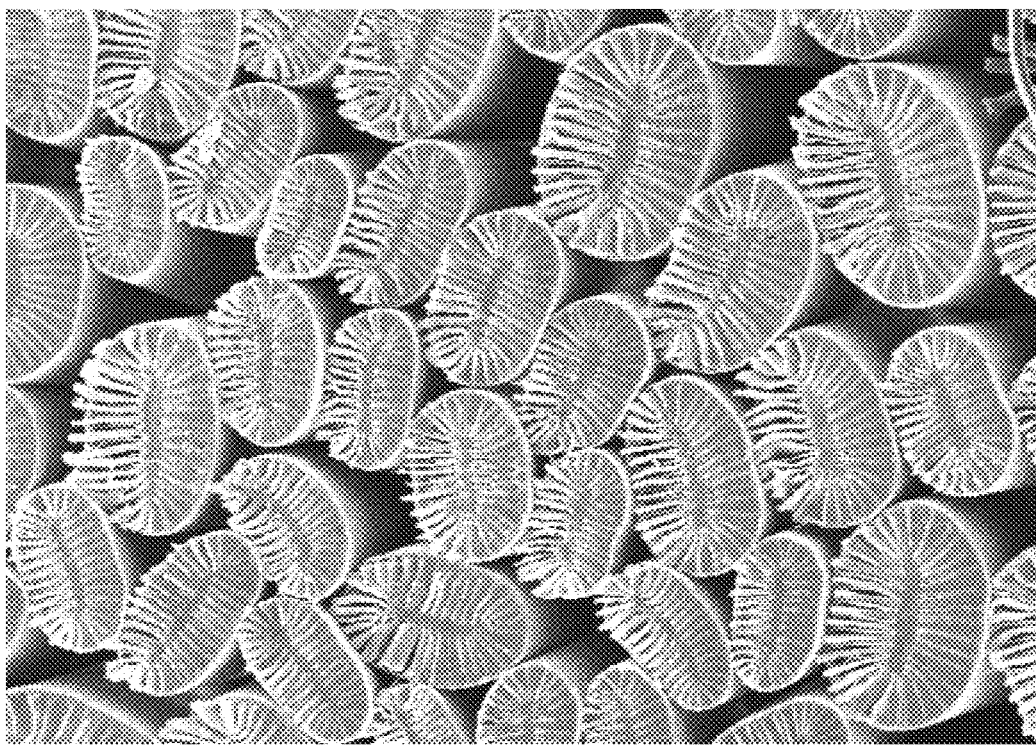
FIG. 23 is a micrograph of high surface area fibers having a winged shape for use in accordance with the present invention.

As noted above, high surface area fibers can additionally or alternatively include non-round fibers. Non-round fibers can be formed with a significantly greater surface-area-to-weight ratio compared with round fibers having the same diameter. Fiber morphologies suitable form the present invention include, but are not limited to, solid or hollow flower shapes (i.e., British flag shape), solid or hollow gear shape, solid or hollow trilobal shape, worm shape, and winged fiber shape. FIGS. 14-23 illustrate several high surface area fibers suitable for use with the above described method. In particular, FIG. 14 is a micrograph of high surface area fibers having a trilobal morphology with an 50% to 100% increase in surface area, and FIG. 15 is a micrograph of a high surface area fiber having a hollow gear-shaped morphology with 100% increase in surface area. FIG. 16 is a micrograph of a high surface area fiber having a flower shape morphology with a 600% increase in surface area, and FIG. 17 is a micrograph of a high surface area fiber having a worm shape or winged shape morphology with a 900% increase in surface area. FIG. 18 is a micrograph of a high surface area fiber having a solid trilobal gear shape, FIG. 19 is a micrograph of a high surface area fiber having a hollow trilobal gear shape, and FIG. 20 is a micrograph of a high surface area fiber having small diameter sheath/core fibers. Other high surface area fibers include, but are not limited to, 4DG™ shaped fibers from Fiber Innovation Technology, Inc. of Johnson City, Tenn., and Allasso shaped fibers from Allasso Industries of Morrisville, N.C. For example, FIG. 21 is an illustration of the 4DG™ high surface area fibers by Fiber Innovation Technology, Inc., FIG. 22 is a micrograph of an Allasso® high surface area fiber by Allasso Industries, and FIG. 23 is a micrograph of high surface area fibers having a winged shape.

V. Foam-Based Adsorbents and Powder-Based Adsorbents

Though described in Parts I-IV above as relating to fiber-based adsorbents, the above described method is also suitable for forming foam-based adsorbents and powder-adsorbents for the recovery of metals from seawater and other aqueous solutions. The method for forming foam-based and powder-based adsorbents is similar to the above described method for forming fiber-based adsorbents, except that a) the starting material includes a foam or a powder, or b) the end product (an adsorbent fiber) is ground into a powder. Exemplary starting materials for foam-based adsorbents include open cell and/or closed cell foams, optionally polyolefin foams, e.g., polyethylene foam and polypropylene foam. In addition, exemplary starting materials for a powder-based adsorbent includes a polyethylene powder, a polypropylene powder and or a polyacrylonitrile powder having a mean granule diameter of about 500 microns or less, optionally about 50 microns or less, and further optionally about 5 microns or less. The foam-based adsorbents and the powder-based adsorbents formed according to the present method include grafted side chains throughout the entire volume of the respective adsorbent. A method for forming a foam-based adsorbent can include the following steps: providing an open-cell or closed-cell polyolefin foam, exposing the polyolefin foam to ionizing radiation, co-grafting polymerizable monomers containing nitrile groups and hydrophilic groups to form grafted side chains, converting the nitrile groups in the grafted side chains into amidoxime groups, and conditioning the foam with an alkaline solution to obtain a foam-based adsorbent capable of complexing metal ions from seawater or other aqueous solution. Co-grafting is optionally performed while the polyolefin foam is exposed to ionizing radiation, or alternatively after the polyolefin foam is exposed to ionizing radiation. A method for forming a powder-based adsorbent can include the following steps: providing a powder including polyolefin granules or polyacrylonitrile granules, exposing the granules to ionizing radiation, co-grafting polymerizable monomers containing nitrile groups and hydrophilic groups to form grafted side chains, converting the nitrile groups in the grafted side chains into amidoxime groups, and conditioning the powder with an alkaline solution to obtain a powder-based adsorbent capable of complexing metal ions from seawater or other aqueous solution. Co-grafting is optionally performed while the polyolefin powder is exposed to ionizing radiation, or alternatively after the polyolefin foam is exposed to ionizing radiation. Where polyacrylonitrile granules are provided, the steps of irradiating and co-grafting can be omitted as noted in Part II above.

VI. Applications Involving Fiber-Based, Foam-Based or Powder-Based Adsorbents

The methods described in Parts I-V above can provide low cost, environmentally benign, high-surface area, reusable adsorbents that can be used for rapidly and selectively extracting significant quantities of valuable and precious dissolved metals or for removing toxic dissolved metals from Earth's water sources including oceans, rivers, streams, lakes, ponds, hot springs, process water, wastewater, groundwater, storm water and landfill/mine leachate. Principal applications for these adsorbents include the extraction of valuable metals from seawater for nuclear energy and defense applications, as well as a broad range of commercial applications. Additionally, these adsorbents can be used for the removal of toxic metals from contaminated water resources. Throughout the world, there are numerous contaminated sites that contain a wide variety of toxic metals. This technology can provide an economical solution for cleaning up and reclaiming these sites and making them available for future use.

The adsorbents can be manufactured with a wide variety of other functional groups besides the amidoxime group that a have a high affinity for other selected metals. These applications can include: 1) the recover of rare earth metals for batteries (lanthanum), lasers (samarium, dysprosium), magnets (neodymium, holmium), and catalysts (lanthanum, cerium); 2) the recovery of other valuable and precious metals or toxic metals from oceans, rivers, streams, and mine run-off; 3) the clean-up of oil spills; 4) the recovery of lithium for battery applications; 5) the collection of scandium from hot springs for use in alloys, high-intensity discharge lamps, tracing agents, and catalysts; 6) the removal of toxic cadmium from scallop processing; and 7) use in ion exchange membranes. In addition, because the adsorbents can be tailored to preferentially adsorb metals at a range of loading levels, using concentrated metal solutions, they can be transformed into polymer-metal complexes that potentially offer many intriguing applications including: 1) polymer-supported metal complex catalysts; 2) battery and fuel cell membranes; and 3) anti-microbial materials (i.e., silver).

The present invention is further illustrated in the following example, which is intended to be non-limiting.

EXAMPLE

A. Preparation of High Surface Area Fibers

Fiber-based adsorbents for the recovery of uranium from aqueous solutions were formed using the below high surface area fibers available from Hills, Inc.:

| Fiber # | Approximate fiber diameter | Fiber shape | $1^{st}$ polymer | $2^{nd}$ polymer | Ratio |
|---|---|---|---|---|---|
| TR-714F-2 (#7) | 1 micron | Round; 330 islands-in-the-sea | Dow 6850 LLDPE Islands | 6202 D PLA Sea | 60/40 |
| TR-714A-9 (#1) | 5 microns | Round; 37 islands-in-the-sea | Dow 61800 LLDPE Islands | 6202 D PLA Sea | 55/45 |
| TR-714A-5 (#3) | 12 microns | Round; Sheath/Core | 6202 D PLA (Sheath) | Dow 61800 LLDPE (Core) | 50/50 |
| TR-714E-1 (#2) | 14 microns | British flag or flower shape | Dow 6850A LLDPE | 6202 D PLA | 50/50 |

-continued

| Fiber # | Approximate fiber diameter | Fiber shape | 1st polymer | 2nd polymer | Ratio |
|---|---|---|---|---|---|
| TR-714F-1 (#8) | 30 microns (tooth-to-tooth; 12-17 microns hollow size) | Hollow gear | Dow 6850 LLDPE (core) | 6202 D PLA (sheath) | 40/60 |
| TR-714F-1 (#11) | 18 microns (tooth-to-tooth) | Solid gear (quasi-trilobal) | 6202 D PLA (Sheath) | Dow 6850 LLDPE (core) | 60/40 |
| TR-714F-2 (#12) | 17 microns (tooth-to-tooth) | Solid gear (circular) | 6202 D PLA (Sheath) | Dow 6850 (Core) | 60/40 |

Prior to irradiation, each of the above fiber types were cut into approximately one inch lengths for ease of handling during processing and evaluation. Several of the high surface area fibers were made using readily dissolvable polylactic acid (PLA). The PLA was removed prior to irradiation by placing the fibers into flasks containing 200 ml of tetrahydrofuran (THF), drying at 50° C. for about two hours, and then filtering. This procedure was repeated a second time with new THF and allowed to sit overnight at 50° C., then filtered and dried at 50° C. under vacuum.

B. Irradiation and Co-Grafting of High Surface Area Polyethylene Fibers

The high surface area polyethylene fibers were put in nitrogen-inerted plastic bags and placed on top of a bed of dry ice and irradiated with electron beams at 200 kGy. After irradiation, the fibers were immersed in a nitrogen-inerted, screw cap flask containing previously nitrogen de-gassed acrylonitrile (AN) and methacrylic acid (MAA) grafting monomers and dimethylsulfoxide (DMSO) and allowed to sit undisturbed for 18 hours at 60° C. The composition of the grafting solutions including the ratio of DMSO solvent (or other solvent(s)) to AN and MAA monomers (or other monomer(s)) included: (a) 50 AN/MAA—106 ml DMSO (50 wt. %), 101 ml AN (35 wt. %), 34 ml MAA (15 wt. %); (b) 75 AN/MAA—50 ml DMSO (25 wt. %), 142 ml AN (53 wt. %), 49 ml MAA (22 wt. %); and (c) 90 AN/MAA—20 ml DMSO (10 wt. %), 172 ml AN (63 wt. %), 59 ml MAA (27 wt. %).

After grafting, the fibers were washed with dimethylformamide (DMF) and methanol and dried at 50-60° C. under vacuum, then weighed to determine the % degree of grafting (% DOG). % DOG is calculated by:

(weight after grafting−weight before grafting)/(weight before grafting)*100

Figure 24:
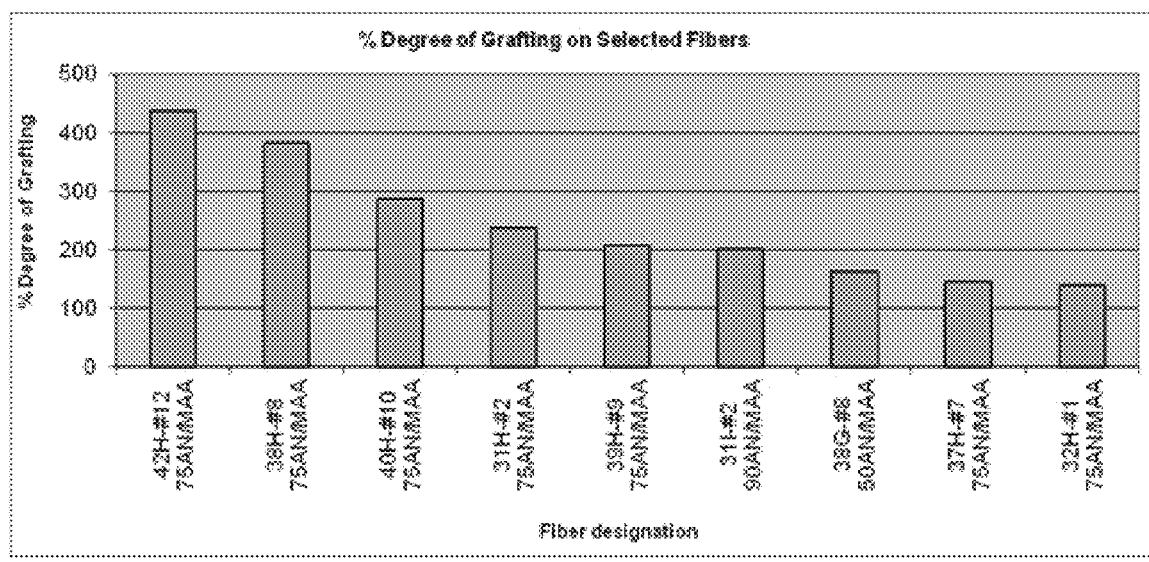
FIG. 24 is a graph illustrating % degree of grafting for selected high surface area fibers.

The % DOG results for some of the high surface area fibers are shown in FIG. 24, in which the sample number is listed, followed by the fiber number and the grafting solution composition (e.g., 42H-#12 75 AN/MAA).

C. Amidoxime Reaction and KOH Conditioning of High Surface Area Fibers

Approximately 150 mg of each type of high surface area grafted fiber was added to 250 ml flasks containing 75 ml of 10% hydroxylamine in 50/50 (v/v) water/methanol solutions. After the flasks were sealed with a screw cap they were allowed to sit undisturbed at 80° C. for 24 hours. The solutions were then drained and the fibers were physically separated to maximize their surface area. Amidoximation of the fiber samples was then conducted a second time by placing the fiber materials in 250 ml flasks containing 75 ml of 10% hydroxylamine in 50/50 (v/v) water/methanol solution. After the flasks were sealed with screw caps they were allowed to sit undisturbed at 80° C. for 24 hours. The solutions were then drained and the fiber samples were washed with de-ionized water and finally with methanol and dried under vacuum at 50° C.

After drying, approximately 15-30 mg of each fiber type was then added to a 40 ml screw cap vial containing 15 ml of 2.5% KOH. After sealing the vials they were shaken intermittently for 3 hours at 80° C. The fibers were then filtered using a 1-inch diameter, Type 304 stainless steel woven wire disk (mesh/inch=80×80; wire diameter=0.0055-inch) and washed three times with 40 ml of de-ionized water until a pH of about 7 was attained, then kept wet until determination of the uranium adsorption capacity was completed using an Inductively Coupled Plasma instrument (ICP).

D. Determination of Uranium Adsorption Capacity on High Surface Area Fiber-Based Adsorbents Using ICP Instrument About 15-30 mg of each fiber-based adsorbent was placed in a sample container containing de-ionized water, 6-7 ppm Uranyl nitrate hexahydrate, 10,123 ppm of sodium ions, 15,529 ppm of chloride ions and 140 ppm of bicarbonate ions with a pH of approximately 8. This container was then allowed to shake for 24 hours at 20-25° C. After shaking the adsorbent was filtered out and a sample of each solution was then put into a plastic cap vial and the ICP instrument was used to determine the final uranium concentration in the solution. The ICP was also used to determine the initial uranium solution concentration prior to adding the adsorbent sample. The uranium adsorption capacity (g-Uranium/kg-adsorbent) was calculated by subtracting the final uranium solution concentration from the initial uranium solution concentration.

Figures 25, 26:
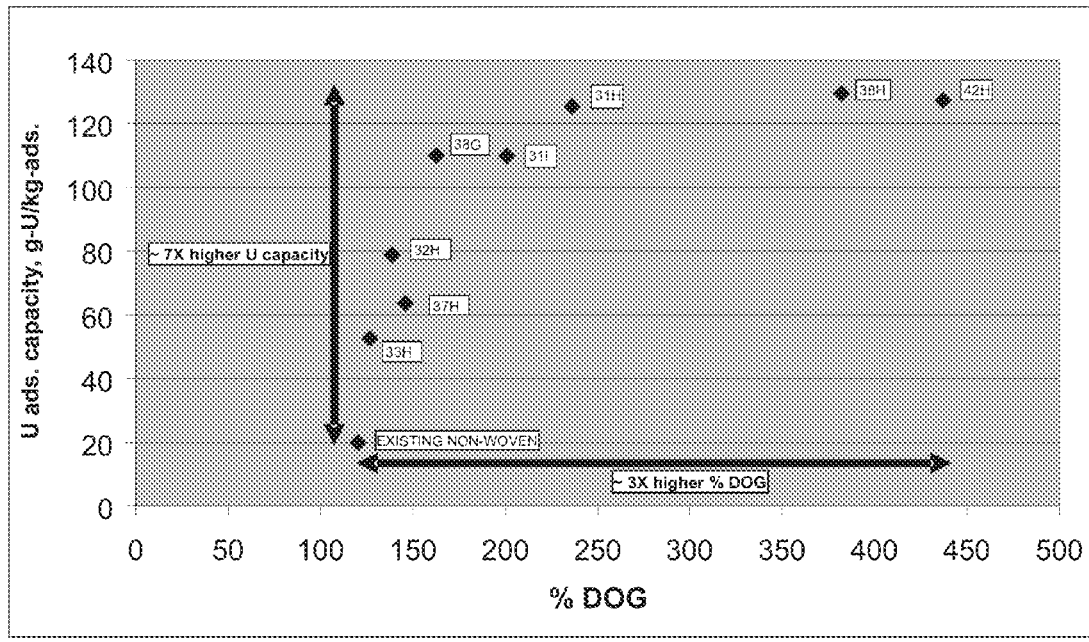
FIG. 25 is a plot of the uranium adsorption capacity versus the % degree of grafting for selected high surface area adsorbents as compared to an existing non-woven adsorbent.
FIG. 26 is a table illustrating the uranium adsorption capacity and the % degree of grafting for selected high surface area adsorbents as compared to an existing non-woven adsorbent.

FIG. 25 is a plot of the measured uranium adsorption capacity versus the % degree of grafting (% DOG) for the high surface area adsorbents formed above and an existing non-woven adsorbent formed from round or circular cross-sectional, 20 micron diameter, high density polyethylene fibers. The measured uranium adsorption capacity for the existing nonwoven adsorbent was approximately 20 g-Uranium/kg-adsorbent, whereas the high surface area adsorbents noted above ranged up to about 130 g-Uranium/kg-adsorbent, which is about seven times higher in value. FIG. 26 includes a table with the % DOG and measured Uranium adsorption capacities for the high surface area adsorbents and the existing non-woven adsorbent. These results clearly demonstrate the significant increase in the Uranium adsorption capacity of high surface area adsorbents that are made from high surface area fibers in accordance with the present embodiments.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for forming a foam-based adsorbent for the recovery of metal ions from an aqueous solution, the method comprising:
   exposing a polymer foam to ionizing radiation and co-grafting polymerizable monomers containing nitrile and hydrophilic groups to form grafted side chains;
   reacting the nitrile groups in the grafted side chains with hydroxylamine to convert the nitrile groups into amidoxime groups; and
   conditioning the grafted polymer foam with an alkaline solution.

2. The method according to claim 1 wherein the polymer foam is polyethylene foam or polypropylene foam.

3. The method according to claim 1 wherein the polymer foam is substantially an open cell foam, and wherein the grafted side chains are formed throughout the open cell foam.

4. The method according to claim 1 wherein the polymer foam is substantially a closed cell foam, and wherein the grafted side chains are formed throughout the closed cell foam.

* * * * *